United States Patent [19]

Buck et al.

[11] 4,161,665
[45] Jul. 17, 1979

[54] MAGNETOSTRICTIVE ENGINE DETONATION SENSOR

[75] Inventors: Charles E. Buck; James M. Johnson; Paul A. Joseph, all of Anderson, Ind.

[73] Assignee: General Motors Corporation, Detroit, Mich.

[21] Appl. No.: 864,209

[22] Filed: Dec. 27, 1977

[51] Int. Cl.² .......................................... H01L 41/06
[52] U.S. Cl. ........................................ 310/26; 73/35; 73/DIG. 2
[58] Field of Search ............... 310/26; 73/DIG. 2, 35, 73/570, 652; 340/11

[56] References Cited

U.S. PATENT DOCUMENTS

| | | | |
|---|---|---|---|
| 2,269,760 | 1/1942 | Eldredge | 310/26 X |
| 2,275,675 | 3/1942 | Draper et al. | 310/26 X |
| 2,435,031 | 1/1948 | Burns et al. | 310/26 |
| 2,445,318 | 7/1948 | Eldredge et al. | 310/26 X |
| 2,534,276 | 12/1950 | Lancor, Jr. | 310/26 X |
| 2,814,742 | 11/1957 | Tognola | 310/26 |
| 2,826,706 | 3/1958 | Sackett | 310/26 |
| 2,978,670 | 4/1961 | Peek, Jr. | 310/26 X |

Primary Examiner—Mark O. Budd
Attorney, Agent, or Firm—Robert M. Sigler

[57] ABSTRACT

A sensor for engine vibrations at a predetermined frequency characteristic of detonation comprises a housing adapted at one axial end for attachment to an internal combustion engine, a magnetostrictive element axially compressed in said housing with a source of permanent magnetic flux and a pickup coil on a spool around the magnetostrictive element. The spool engages the magnetostrictive element in a force fit characterized by a predetermined push-out force. The sensor housing comprises a first resonant assembly having a first resonant frequency slightly higher than the predetermined frequency. The spool and coil are coupled to the magnetostrictive element by the force fit to comprise a second resonant assembly having a second resonant frequency slightly lower than the predetermined frequency. The overall output characteristic of the sensor thus has a single resonant peak at substantially the predetermined frequency.

3 Claims, 4 Drawing Figures

MAGNETOSTRICTIVE ENGINE DETONATION SENSOR

BACKGROUND OF THE INVENTION

This invention relates to detonation sensors for use in systems to detect knock or detonation in internal combustion engines. It particularly relates to such sensors of the magnetostrictive type in which a magnetostrictive element serving as a flux path for a source of constant magnetic flux is surrounded by a pickup coil wound on a spool and subjected to engine vibrations to vary the flux therein and generate corresponding signals in the pickup coil.

The engine knock or detonation to be detected by such a sensor has been found to produce vibrations in the engine which show a particular characteristic relationship between amplitude and frequency, at least for a particular type of engine. This relationship usually takes the form of strong vibrations due to knock at at least one particular characteristic frequency. Since there are usually many other sources of vibration in a typical internal combustion engine, it is desirable to distinguish those vibrations due to knock from the other vibrations if knock is to be accurately detected. In this regard, it is often helpful to provide a sensor with a predetermined frequency response characteristic to attenuate in its output signal those vibrations at other frequencies compared with those vibrations at the characteristic frequency due to knock.

This invention further relates to detonation sensors of the type designed for use on actual working engines in motor vehicles and therefore designed for mass production at a reasonable cost. Such sensors are useful in systems which detect knock and control engine spark timing to maintain said knock at a level which is acceptable to a vehicle operator. The materials and assembly techniques used in the manufacture of such sensors help determine their suitability for such mass use as opposed to manufacture and use in much smaller volume as more expensive laboratory test equipment.

SUMMARY OF THE INVENTION

This invention comprises a sensor of the type having a generally cylindrical case axially compressing a magnetostrictive element and containing a pickup coil wound on a spool and surrounding the magnetostrictive element. The case is adapted at one axial end for attachment to the engine for vibration therewith and comprises a first resonant assembly having a first resonant frequency which, in practice, is somewhat higher than the predetermined frequency of engine vibrations characteristic of knock or detonation. The first resonant frequency can be adjusted downward by changing the dimensions of various portions of the case; but it is desirable, from the standpoint of the overall strength of the case, to stop at a frequency slightly higher than the predetermined frequency.

It has been found, in the type of sensor described above, that the engagement by the spool of the magnetostrictive element in a force fit couples the mass of the spool and pickup coil to the magnetostrictive element to form a second resonant assembly having a second resonant frequency somewhat less than the predetermined frequency. This second resonant frequency can be adjusted upward by selection of the spool and coil mass, the push-out force of the force fit and, especially, by the material of the spool. However, it is desirable, in view of the higher cost of spool materials having the greater stress capacity required for higher resonant frequencies, to stop the adjustment at a frequency slightly lower than the predetermined frequency.

When the sensor is constructed, however, having a first resonant assembly with a first resonant frequency slightly higher than the predetermined frequency and a second resonant assembly having a second resonant frequency slightly below the predetermined frequency, the overall output response characteristic presents a single resonant peak at substantially the predetermined frequency; and it is thus possible, by using both resonant assemblies, to produce a sensor with the desired resonance while preserving the strength of the case and maintaining a low cost suitable for mass production.

Further details and advantages of this invention will be apparent from the accompanying drawings and following description of a preferred embodiment.

DESCRIPTION OF THE PREFERRED EMBODIMENT

Figure 1:
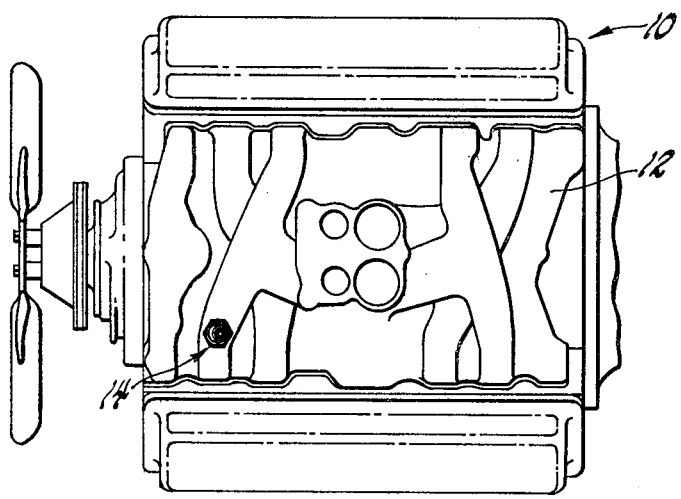
FIG. 1 shows an internal combustion engine including a sensor according to this invention.

Referring to FIG. 1, an internal combustion engine 10 has a plurality of cylinders and an intake manifold 12 for use with means such as a carburetor, not shown, to deliver a fluid fuel component to said cylinders. Engine 10 is adapted to combine hydrocarbon or other fuel with oxygen within said cylinders and convert a portion of the energy of reaction into mechanical force through the expansion of the gases therein against pistons which turn a crankshaft and thereby propel a vehicle. In a spark ignition engine, the reactions in each cylinder are initiated by the firing of a spark plug at a predetermined time to produce a smooth expansion of the gases against the pistons.

As is well known in the art, however, a number of factors such as low octane gasoline, too much spark advance or unfavorable environmental factors may cause an uneven expansion of the gases with resulting sharp vibrations in the engine structure known as knock or detonation. This knock or detonation, if strong enough, may be audible and annoying to vehicle occupants; in extreme cases, it might damage engine parts.

In the U.S. patent to Harned et al No. 4,002,155, a system is disclosed to sense the knock-induced ringing vibrations of an engine component, measure the severity of such vibrations and retard spark timing from the normal timing, when necessary, by an amount sufficient to maintain said knock at a borderline level. This system requires a vibration sensor suitable for mounting on an engine component and effective to produce an output electrical signal corresponding to the vibrations experienced thereby. Another such system is described in the two patent applications U.S. Ser. No. 789,801 by Gene A. West, filed Apr. 22, 1977 and U.S. Ser. No. D-1,363 by Gene A. West and Glen C. Hamren, filed November, 1977, both of which are assigned to the assignee of this application.

Magnetostrictive detonation sensor 14 is fixedly mounted on intake manifold 12, as seen in FIG. 1, to vibrate therewith. The particular location of sensor 14 shown is not important to this invention and may not even be the optimum location for the sensor; however, it is a location which has been found to be effective in at least one type of engine as described in the aforementioned Harned et al patent.

Figure 2:
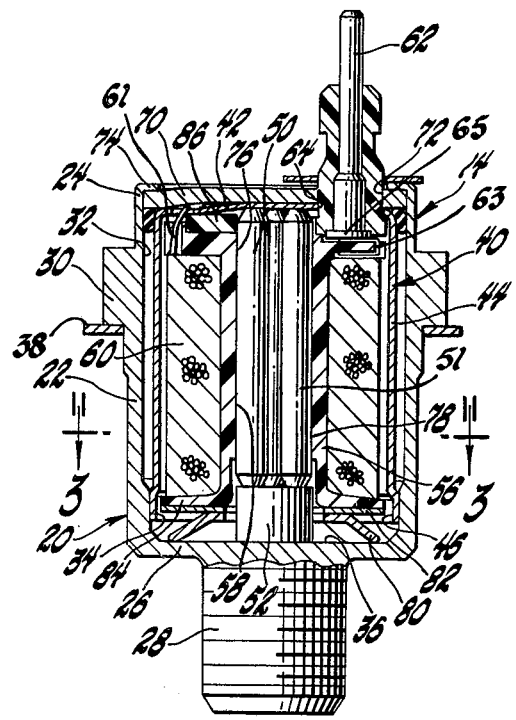
FIG. 2 shows a side cutaway view of a sensor according to this invention.
Figure 3:
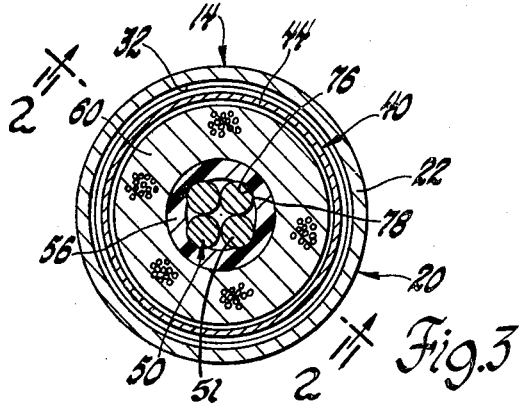
FIG. 3 shows a section view along line 3—3 in FIG. 2.

The structure of sensor 14 is shown in more detail in FIGS. 2 and 3. Referring to FIG. 2, sensor 14 comprises an outer case 20 made of a magnetic material such as steel. Case 20 comprises a generally cylindrical portion 22 having an open axial end 24 and a closed axial end 26 with a threaded stud 28 extending axially therefrom. Threaded stud 28 is adapted for attachment to intake manifold 12 so that outer case 20 vibrates with that portion of intake manifold 12 on which it is mounted.

A hexagonal collar 30 is provided on outer case 20 for engagement by a wrench used to turn threaded stud 28 into a matching threaded concavity in intake manifold 14; however, the inner surface 32 of cylindrical portion 22 is cylindrical in shape with a step down bore 34 of slightly reduced inner diameter adjacent the inner axial surface 36 at the closed end 26 of outer case 20. A wrench stop ring may be pressed onto case 20, as shown in FIG. 2, directly under hexagonal collar 30.

Within cylindrical portion 22 is disposed an inner case 40 made of a magnetic material such as steel. Inner case 40 is generally cylindrical in shape with a closed axial end 42, a cylindrical side wall 44 and an open axial end 46. Open axial end 46 is axially, slideably received within step down bore 34 of outer case 20; and closed end 42 is disposed just within open end 24 of outer case 20.

A magnetostrictive element 50 and a permanent magnet 52, axially in line therewith, are disposed between the closed end 42 of inner case 40 and the inner surface 36 of outer case 20. The magnetostrictive element 50, in this embodiment, comprises four parallel rods 51 made from a magnetostrictive material such as a 49% nickel and iron alloy, a material well known in the art. Since these magnetostrictive rods 50 are part of a magnetic flux path surrounded by a current carrying pickup coil, multiple rods are used to minimize eddy currents, which would be stronger in a single rod.

The magnetostrictive rods 50 possess the property of magnetostriction, so that they change their magnetic reluctance as the stress on them is changed. The magnet 52 is disk shaped from a standard magnetic material such as, for example, Alnico 5 and is axially aligned with magnetostrictive element 50. The length of magnetostrictive element 50 and the axial thickness of permanent magnet 52 are such that together they are slightly longer than cylindrical side wall 44 of inner case 40 and thus prevent the open end 46 of inner case 40 from abutting surface 36 of outer case 20. Thus, the greater portion of any axial force tending to push inner case 40 inward toward inner surface 36 of outer case 20 is taken by magnet 52 and magnetostrictive element 50.

A spool 56 is disposed axially within inner case 40 with magnetostrictive element 50 disposed within the inner axial opening 58 thereof. A pickup coil 60 is wound on spool 56 within inner case 40; and electrical signals are induced in coil 60 by their changes in magnetic flux in magnetostrictive element 50 caused by vibrations of the sensor in the axial direction. One end 61 of coil 60 is grounded by connection through the outer case 20 to engine 10; and the other end 63 of coil is connected to a contact 63 on one axial end of spool 56 which engages an inner end 65 of a terminal member 62, which projects through an opening 64 in inner case 40 and outer case 20 for connection to external apparatus for the processing of the output electrical signals.

A washer 70 is disposed outside and against closed axial end 42 of inner case 40, with an opening 72 therethrough to accommodate terminal assembly 62. Washer 70 can be made from a magnetic material such as steel and is pressed against closed axial end 42 by a crimped over flange 74 at the open axial end 24 of outer case 20. Thus flange 74 operatively engages inner case 40 to apply therethrough preload stress to the magnetostrictive rods 50, so that their magnetic reluctance can be changed by vibration of the sensor 14 in the axial direction.

Opening 58 in spool 56 is defined by a generally cylindrical inner surface 76 which engages the outer surface 78 of magnetostrictive element 50, as seen most clearly in FIG. 3. Spool 56 is typically made of a plastic material and engages magnetostrictive element 50 in an interference or force fit having a predetermined push-out force. This fit is defined as one in which magnetostrictive element 50 and spool 56 are frictionally engaged so that they are held together against axial movement by the friction of their engagement until a relative axial force at least equal to the predetermined push-out force is applied to them. In this embodiment, a push-out force of 90 to 100 pounds, after thermal cycling, has been found to be effective. However, the precise push-out force required will vary in different embodiments, with the precise sizes of the parts and may be varied considerably within the scope of this invention.

The case of this sensor forms a first resonant assembly which includes an inertial mass, comprising inner case 40, terminal assembly washer 70 and all of outer case 20 except mounting stud 28 and axial end 26, suspended on a spring like member comprising axial end 26 of outer case 20. This resonant assembly has a resonant frequency for axial vibration determined by the equivalent mass and spring characteristics, which depend, in turn, on the materials and dimensions of the parts. The greater amplitude of mechanical vibration of the end of the case opposite stud 28 at the resonant frequency produces a greater variation in the compressive stress on magnetostrictive element 50 and therefore a greater amplitude in the electrical output signals.

The resonant frequency of the case is found to be generally higher than the desired 6.3 kilohertz. Adjustment of this frequency downward can be accomplished by changing the materials of the case or certain dimensions, most practically the axial thickness of axial end 26 of outer case 20; however, it is found that the strength of the case decreases as the adjustment is made. Therefore, it is desirable to not decrease this resonant frequency any more than necessary in the vicinity of 6.3 kilohertz.

The force fit of spool 56 on magnetostrictive element 50 creates a second resonant assembly as the mass of the spool 56 and coil 60 responds to external vibration forces and creates corresponding stresses in magnetostrictive element 50 along the surface of engagement with spool 56 with a resonant frequency determined by the physical properties of the assembly. Once the size of the spool and coil is decided, the variable factors are the material of the spool and the pressure of the force fit between spool 56 and magnetostrictive element 50, as measured by the push-out force.

It is found that the resonant frequency of the second resonant assembly is somewhat lower than 6.3 kilohertz but can be raised by increasing the stress of the force fit, as measured by the push-out force. However, in order to prevent cold flow in the spool at operating temperatures near the engine of over 160° F., which would operate to lessen the stress and thus the resonant frequency, a more expensive plastic material must be used. Thus it is desirable to bring the resonant frequency of the second resonant assembly no closer to 6.3 kilohertz than necessary.

Figure 4:
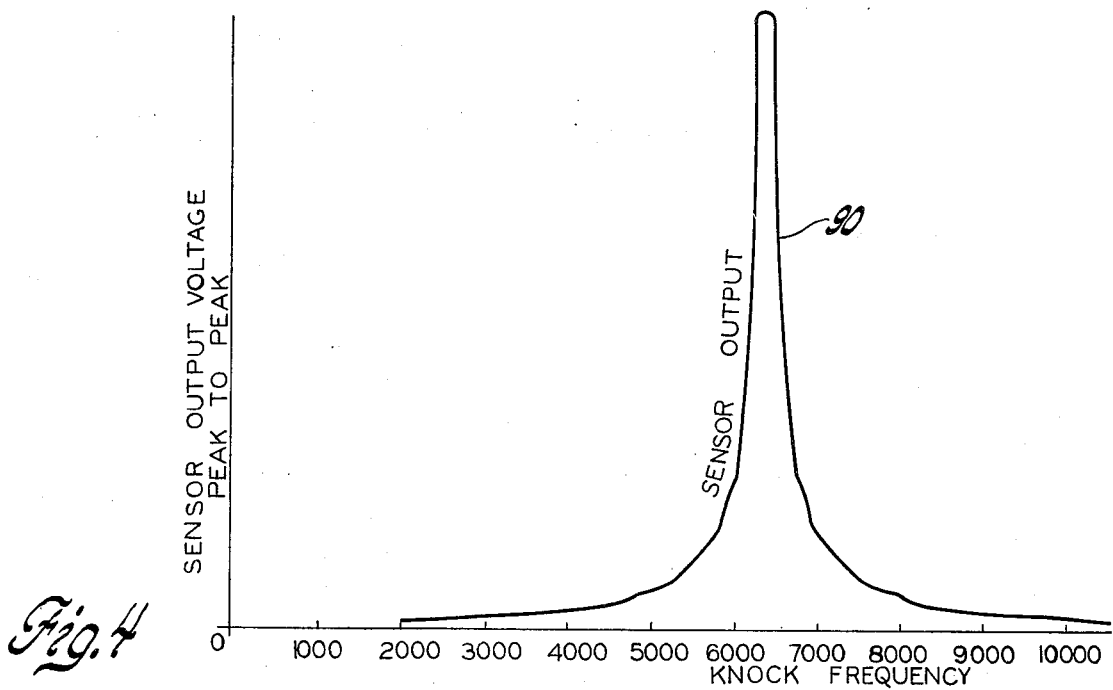
FIG. 4 shows a graph describing the output amplitude versus frequency characteristic of the sensor of FIG. 2.

An acceptable resonant peak at 6.3 kilohertz has been found to be obtainable without bringing either of the above-discussed resonant frequencies to that value. For example, with the first resonant frequency at 7.2 kilohertz and the second resonant frequency at 5.8 kilohertz, an overall sensor output characteristic has been obtained which has a single resonance peak centered substantially at 6.3 kilohertz with no significant valley or dip at the center. A typical sensor output characteristic curve from 2 to 10 kilohertz for a sensor according to this invention is shown as curve 90 of FIG. 4. Of course, if the first and second resonant frequencies are too far apart, the sensor output characteristic will separate into two peaks with a central valley or dip where the desired peak should be. One skilled in the art, however, can determine by experiment, for any specific sensor design, what is the widest spread between the first and second resonant frequencies that gives an acceptable output at 6.3 kilohertz.

With reference to FIG. 2, opening 76 of spool 56 is seen to be not cylindrical, but to conform, in the vicinity of each rod 51 to the shape of the rod. This is done to spread the stress of the force fit over a greater area in the plastic spool 56 so that the spool may handle a higher push-out force and thus a higher resonant peak. The shape also results in a radially thicker wall in spool 56 between rods 51 for greater overall strength of spool 56, with a similar result. However, a greater or lesser conformity between surface 76 and rods 51 might be used by those skilled in the art within the scope of this invention.

It is necessary to axially position spool 56 within inner case 40 so that contact 63, as previously mentioned, engages terminal member 62. Thus, a spring member 80 is provided between surface 36 of outer case 20 and a washer 82 abutting end 84 of spool 56. Since spool 56 engages magnetostrictive element 50 in a predetermined push-out force, spring member 80 must have a working force at least equal to the predetermined push-out force and preferably larger to provide a margin for error. A typical force for spring member 80, in this embodiment, would be 150 pounds. This would be sufficient to initially automatically position spool 56 and also return spool 56 to its desired position after any hard axial blows or shocks which might temporarily shift it from the desired position. However, the force fit between spool 56 and magnetostrictive element 50 continues to be effective in coupling the mass of spool 56 and coil 60 to magnetostrictive element 50 for resonant vibration at the desired frequency, even with spring member 80 in place.

Although a specific embodiment is described, other embodiments will be seen to be equivalent by those skilled in the art. Therefore, this invention should be limited only by the claims which follow.

The embodiments of the invention in which an exclusive property or privilege is claimed are defined as follows:

1. A vibration sensor adapted for use with a spark ignited internal combustion engine to detect ringing vibrations of a predetermined frequency due to engine knock, comprising, in combination:

a generally cylindrical housing having opposing axial ends, one of said axial ends having means adapted for attachment to the engine for axial vibration therewith, the housing forming a first resonant assembly having a first resonant frequency slightly higher than the predetermined frequency;

an elongated magnetostrictive element compressed longitudinally and aligned axially between the axial ends of the housing, the magnetostrictive element including a source of permanent magnetic flux defining a flux path in longitudinal orientation therethrough and characterized by a reluctance which varies in response to vibration induced variations in magnetostrictive element compression;

a pickup assembly comprising a spool and a pickup coil wound on the spool, the spool having a surface defining an axial opening therethrough and being disposed in the housing with the magnetostrictive element extending through the axial opening, whereby the pickup coil is adapted to sense the vibration-induced reluctance changes in the magnetostrictive element and generate an output electrical signal, the spool further engaging the magnetostrictive element along said surface in a force fit characterized by at least a predetermined push-out force, the pickup assembly thereby being physically coupled to the magnetostrictive element to form a second resonant assembly having a second resonant frequency slightly lower than the predetermined frequency, the first and second resonant assemblies, in combination, being effective to establish a single resonant peak at substantially the predetermined frequency in the sensor electrical output signal characteristic.

2. A vibration sensor adapted for use with a spark ignited internal combustion engine to detect ringing vibrations of a predetermined frequency due to engine knock, comprising, in combination:

a generally cylindrical housing having opposing axial ends and being adapted at one of said axial ends for attachment to the engine for axial vibration therewith, the housing comprising a first resonant assembly having a first resonant frequency slightly higher than the predetermined frequency;

magnetostrictive means comprising a plurality of parallel magnetostrictive rods compressed in stress axially between the opposing axial ends of the housing and a source of magnetic flux effective to establish a flux path axially through the rods, the flux path being characterized by a reluctance which varies with vibration-induced variations in stress within the rods;

a pickup assembly comprising a spool and a pickup coil wound on the spool, the spool having an inner surface defining an axial opening therethrough and being disposed in the housing with the magnetostrictive rods extending through the axial opening, whereby the pickup coil is adapted to sense the vibration-induced reluctance variations in the rods and generate an output electrical signal therefrom, the spool further engaging the magnetostrictive rods along said surface in a force fit characterized by at least a predetermined push-out force, the spool surface in the vicinity of each rod conforming in shape to the rod for a substantial area of contact therebetween to spread the stress of the force fit in the spool, the pickup assembly thereby being physically coupled to the rods to form a second resonant assembly having a second resonant frequency slightly lower than the predetermined frequency, the first and second resonant assemblies in combination being effective to establish, in the sensor electrical signal output characteristic, a single resonant peak at substantially the predetermined frequency.

3. A vibration sensor adapted for use with a spark ignited, internal combustion engine to detect ringing vibrations due to engine knock, comprising, in combination:

housing means having opposing axial ends and means on one of the axial ends for attachment to the engine for vibration therewith, the housing means comprising a first resonant assembly having a first resonant frequency slightly higher than the predetermined frequency;

an elongated magnetostrictive element compressed longitudinally between the axial ends of the housing, the magnetostrictive element including a source of permanent magnetic flux in longitudinal orientation therethrough and defining, with the housing means, a flux path characterized by a reluctance which varies in response to vibration-induced variations in magnetostrictive element compression;

a pickup assembly comprising a spool and a pickup coil wound on the spool, the spool having a surface defining an axial opening therethrough and being disposed in the housing with the magnetostrictive element extending through the axial opening, whereby the pickup coil is adapted to sense the vibration-induced reluctance changes in the magnetostrictive element and generate an electrical output signal therefrom, the spool further engaging the magnetostrictive element along said surface in a force fit characterized by a predetermined push-out force, whereby the pickup assembly is coupled physically to the magnetostrictive element to form a second resonant assembly having a second resonant frequency slightly lower than the predetermined frequency, the spool further having an electrical contact at one axial end thereof connected to the pickup coil;

an electrical terminal member projecting through the housing means and being adapted, at one end within the housing means, to engage the spool electrical contact, whereby a conduit for the electrical output signal is provided to a point external of the housing means; and a spring axially disposed between the pickup assembly and one axial end of the housing, the spring exerting an axial force on the pickup assembly greater than the push-out force between the spool and magnetostrictive element, whereby the pickup assembly is automatically and permanently axially positioned with the spool electrical contact and terminal member in engagement while the coupling between the spool and magnetostrictive element is retained, the first and second resonant assemblies, in combination, being effective to establish an overall sensor electrical output signal characteristic with a single resonant peak at substantially the predetermined frequency.

* * * * *